Aug. 24, 1937. E. FREY Re. 20,480

WRIST WATCH

Original Filed Dec. 16, 1929 2 Sheets-Sheet 1

Inventor:
Emile Frey
By Lucien Quiévreux
Attorney

Aug. 24, 1937. E. FREY Re. 20,480

WRIST WATCH

Original Filed Dec. 16, 1929 2 Sheets-Sheet 2

Inventor.
Emile Frey
By Lucius Daniels Jr.
Attorney.

Reissued Aug. 24, 1937

Re. 20,480

UNITED STATES PATENT OFFICE 20,480

WRIST WATCH

Emile Frey, deceased, late of Bienne, Switzerland, by The Gruen Watch Company, Time Hill, Ohio, assignee Original No. 1,855,952, dated April 26, 1932, Serial No. 414,518, December 16, 1929. Application for reissue September 28, 1936, Serial No. 102,965. In Switzerland April 23, 1929

11 Claims. (Cl. 58—59)

Figures 1, 2, 3:
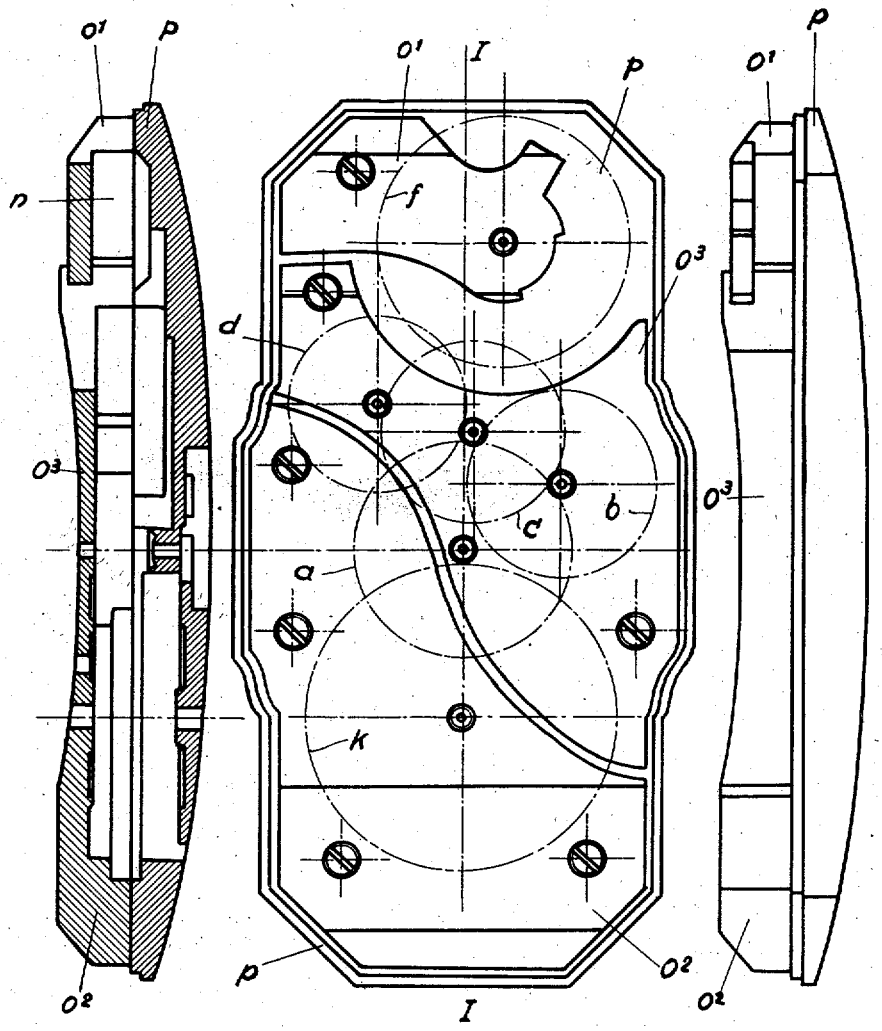

The present invention relates to wrist watches.

The object of the invention is to provide wrist watches applied more closely to the curved surfaces of the wrist and it consists in a combination of a plate and bridges where plate and bridges have their surfaces facing the casing curvilinear and the surfaces facing the wheels plane, and where owing to a special arrangement of parts the bulk of the watch has been reduced without diminishing the size of parts accordingly.

In the accompanying drawings one embodiment of the invention has been illustrated. In the drawings Fig. 1 is a section on the line I—I of Fig. 2, Fig. 2 is a plan view, Fig. 3 is a side elevation, Figs. 4 and 5 are diagrams showing more clearly by a plan and a section the particular arrangement of parts.

According to the Figures 1 to 3 the plate $p$ is provided on its inside surface with recesses for the different wheels. These recesses are all parallel to each other and perpendicular to the axes of the wheels. The outside surface however of the plate is convex so as to fit a casing of the same shape. The bridges, $o_2$, $o_3$ which are fixed to the plate are limited on the side of the wheels by planes parallel to the planes of the plate and on the outside by a concave surface fitting that of the casing not shown. $o_2$ may be curved on the outside also, if necessary.

Figure 4:
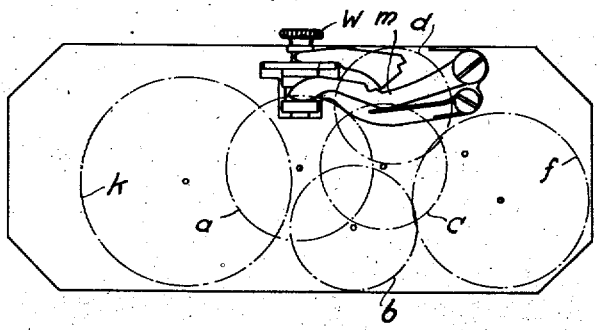
Figure 5:
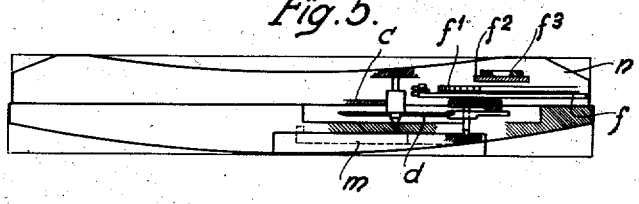

According to the present invention in the arrangement of parts according to the Figs. 4 and 5 the lever escape wheel $d$ is not located nearly in the same plane with the pivoted detent as in ordinary wrist watches, but directly above the same, as shown in Fig. 5. This arrangement achieves the advantages while keeping the rest of the movement very low elevating end $n$ of the casing for locating there the balance wheel $f$, spring $f_1$, balance cock $f_2$ and index $f_3$. Thus the movement utilizes the space as much as can be. Not only the whole length of the movement is shortened, but also the dial has obtained a solid base, the uniform thickness of the movement has rather diminished than increased and the same size of the parts has been maintained.

It will be understood that it is desired to comprehend within the invention such modifications as may be necessary to adapt it to varying conditions and uses.

What is claimed is:

1. In an oblong wrist watch having a case curved on both sides and all wheels disposed in parallel planes, a plate and bridges positioned on one side of such plate, said plate and said bridges having their surfaces facing the case conforming to the contour thereof and their surfaces facing the wheels plane.

2. In an oblong wrist watch having a case curved on both sides, a plate for supporting the wheels of the watch, said plate having the surface disposed on the side of the case of convex form to support a dial and the surfaces on the side of the wheels of rectilinear planar form, and bridges having the surface disposed on the side of the case of concave form.

3. In an oblong wrist watch having a casing and movement curved according to the rounded form of the wrist, a winding mechanism positioned relatively near the longitudinal center of the casing, a lever escape wheel provided above a portion of the winding arrangement and a balance wheel and associated parts positioned at a higher level and partly overlapping said lever escape wheel within the curved end of the movement.

4. In an oblong wrist watch having a casing and movement according to the rounded form of the wrist, a winding device with the winding button arranged relatively near the longitudinal center of a side of the casing, an escape wheel provided above a portion of said winding device and a balance wheel, spring, cock and index positioned above said escape wheel in the curved end of the movement.

5. In an oblong wrist watch having a case, comprising a plate for supporting the wheels of the watch, said plate having the surface disposed on the side of the case of convex form to support a dial and the surfaces on the side of the wheels of rectilinear planar form.

6. In an oblong wrist watch having a case, comprising a plate for supporting the wheels of the watch, said plate having the surface disposed on the side of the case of convex form to support a dial and the surfaces on the side of the wheels of rectilinear planar form, and bridges having a flat surface.

7. In an oblong wrist watch having a case, a plate for supporting the wheels of the watch, said plate having a flat rear surface and a convex front surface to support a dial.

8. In an oblong wrist watch having a case, a plate for supporting the wheels of the watch, said plate having the surface disposed on the side of the case of convex form to support a dial, and bridges on the opposite face thereof having thereon exterior surfaces lying substantially in a plane.

9. In an oblong wrist watch having a case, a plate for supporting the wheels of the watch, said plate having the surface disposed on the side of the case of convex form to support a dial and the surfaces of the side of the wheels of rectilinear planar form, and bridges having faces adapted to accommodate themselves to the plate and case.

10. In an oblong wrist watch having a case and all wheels of the time train disposed in parallel planes, a support for said wheels comprising a plate and bridges, said support having a curved front face and a flat area on the rear face.

11. In an oblong wrist watch having a case curved on both sides and all wheels of the time train disposed in parallel planes, a plate, bridges positioned on one side of such plate, said plate and said bridges having their front and back surfaces, respectively facing the case of different surface conformation and substantially parallel thereto.

THE GRUEN WATCH CO.,
*Assignee of Emile Frey, Deceased,*
By BENJAMIN S. KATZ,
*President.*